United States Patent
Kim et al.

(10) Patent No.: US 12,432,673 B2
(45) Date of Patent: Sep. 30, 2025

(54) ELECTRONIC DEVICE FOR SYNCHRONIZATION IN D2D COMMUNICATION ENVIRONMENT AND METHOD THEREFOR

(71) Applicant: Samsung Electronics Co., Ltd., Suwon-si (KR)

(72) Inventors: Hyoungkwon Kim, Suwon-si (KR); Sanggyu Kim, Suwon-si (KR); Minseok Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 403 days.

(21) Appl. No.: 18/161,354

(22) Filed: Jan. 30, 2023

(65) Prior Publication Data

US 2023/0180163 A1    Jun. 8, 2023

Related U.S. Application Data

(63) Continuation of application No. PCT/KR2021/011067, filed on Aug. 20, 2021.

(30) Foreign Application Priority Data

Aug. 21, 2020  (KR) .................. 10-2020-0105068

(51) Int. Cl.
*H04W 56/00* (2009.01)
(52) U.S. Cl.
CPC .............. *H04W 56/0015* (2013.01)
(58) Field of Classification Search
None
See application file for complete search history.

(56) References Cited

U.S. PATENT DOCUMENTS 9,241,340 B2   1/2016  Yie et al.
9,264,191 B2   2/2016  Ellenbeck et al.
(Continued)

FOREIGN PATENT DOCUMENTS

JP   2014-204142 A   10/2014
JP   2017-103681 A    6/2017
(Continued)

OTHER PUBLICATIONS

Nokia, Synchronization Procedure for D2D Communication and Discovery, May 2014, 3GPP TSG-RAN WG1 Meeting #77, R1-142453, pp. 1-7. (Year: 2014).*

*Primary Examiner* — Nicholas Sloms
(74) *Attorney, Agent, or Firm* — Jefferson IP Law, LLP

(57) ABSTRACT

An electronic device is provided. The electronic device includes a communication circuit, a memory, and a processor operatively connected to the communication circuit and the memory, wherein the processor may be configured to detect an event for transmission of a synchronization signal in a device-to-device (D2D) mode, start a first timer stored in the memory, transmit a synchronization signal at a specified first timing during a first time period during which the first timer operates, and attempt to receive a synchronization signal at a specified second timing during the first time period, sense that a synchronization signal and a valid data packet have not been received by the time that the first timer expires, and attempt to receive a synchronization signal at a timing corresponding to the designated first timing during the second time period after the first timer has expired.

20 Claims, 10 Drawing Sheets

(56) References Cited

U.S. PATENT DOCUMENTS

| | | | |
|---|---|---|---|
| 9,270,425 B2 | 2/2016 | Xue et al. | |
| 9,609,503 B2 | 3/2017 | Ro et al. | |
| 9,867,230 B2 | 1/2018 | Ro et al. | |
| 9,930,684 B2 | 3/2018 | Hwang et al. | |
| 9,949,145 B2 | 4/2018 | Lee et al. | |
| 9,986,410 B2 | 5/2018 | Mok et al. | |
| 10,136,469 B2 | 11/2018 | Ro et al. | |
| 10,165,533 B2 | 12/2018 | Feng et al. | |
| 10,225,810 B2 | 3/2019 | Ryu et al. | |
| 10,439,769 B2 | 10/2019 | Khoryaev et al. | |
| 10,531,414 B2 | 1/2020 | Ryu et al. | |
| 10,687,312 B2 | 6/2020 | Chae et al. | |
| 10,736,066 B2 | 8/2020 | Cai et al. | |
| 10,887,854 B2 | 1/2021 | Feng et al. | |
| 11,006,389 B2 | 5/2021 | Hwang et al. | |
| 11,411,692 B2 | 8/2022 | Gupta | |
| 11,425,630 B2 | 8/2022 | Joo et al. | |
| 2014/0328329 A1* | 11/2014 | Novlan | H04W 56/0015 370/336 |
| 2015/0016354 A1 | 1/2015 | Yie et al. | |
| 2015/0117375 A1* | 4/2015 | Sartori | H04W 56/002 370/329 |
| 2015/0215855 A1 | 7/2015 | Yie et al. | |
| 2015/0215957 A1 | 7/2015 | Yie et al. | |
| 2015/0271771 A1* | 9/2015 | Park | H04W 56/0015 370/350 |
| 2015/0327204 A1* | 11/2015 | Park | H04W 24/10 370/350 |
| 2015/0358907 A1* | 12/2015 | Berggren | H04W 52/0235 455/574 |
| 2016/0044619 A1* | 2/2016 | Ryu | H04W 72/23 370/350 |
| 2016/0095074 A1* | 3/2016 | Park | H04W 56/001 370/350 |
| 2016/0192309 A1* | 6/2016 | Kim | H04W 56/0025 370/350 |
| 2016/0219443 A1 | 7/2016 | Lee et al. | |
| 2016/0345279 A1* | 11/2016 | Gunnarsson | H04W 56/002 |
| 2016/0353478 A1* | 12/2016 | Kim | H04W 72/23 |
| 2017/0086158 A1 | 3/2017 | Feng et al. | |
| 2017/0251425 A1* | 8/2017 | Khoryaev | H04W 8/005 |
| 2017/0339670 A1 | 11/2017 | Chae et al. | |
| 2019/0082411 A1 | 3/2019 | Feng et al. | |
| 2019/0200312 A1* | 6/2019 | Ryu | H04W 72/0446 |
| 2019/0200313 A1 | 6/2019 | Cai et al. | |
| 2019/0289573 A1 | 9/2019 | Hwang et al. | |
| 2019/0356466 A1* | 11/2019 | Kratz | H04J 3/0682 |
| 2021/0092701 A1 | 3/2021 | Feng et al. | |
| 2021/0127341 A1* | 4/2021 | Yasukawa | H04W 24/08 |
| 2021/0144665 A1 | 5/2021 | Ryu et al. | |
| 2021/0235422 A1 | 7/2021 | Hwang et al. | |

FOREIGN PATENT DOCUMENTS

| | | |
|---|---|---|
| JP | 2017-135757 A | 8/2017 |
| KR | 10-2015-0088739 A | 8/2015 |
| KR | 10-2015-0089896 A | 8/2015 |
| KR | 10-2017-0003930 A | 1/2017 |
| KR | 10-2019-0095255 A | 8/2019 |
| KR | 10-2021-0091948 A | 7/2021 |
| WO | 2016/021963 A1 | 2/2016 |
| WO | 2016/072705 A1 | 5/2016 |
| WO | 2016/129573 A1 | 8/2016 |

* cited by examiner

ELECTRONIC DEVICE FOR SYNCHRONIZATION IN D2D COMMUNICATION ENVIRONMENT AND METHOD THEREFOR

CROSS-REFERENCE TO RELATED APPLICATION(S)

This application is a continuation application, claiming priority under § 365(c), of an International application No. PCT/KR2021/011067, filed on Aug. 20, 2021, which is based on and claims the benefit of a Korean patent application number 10-2020-0105068, filed on Aug. 21, 2020, in the Korean Intellectual Property Office, the disclosure of which is incorporated by reference herein in its entirety.

BACKGROUND

1. Field

The disclosure relates to a technology for synchronization in a device-to-device (D2D) communication environment.

2. Description of Related Art

Researches on various types of D2D communication (e.g., proximity service (ProSe), sidelink communication) are carried out. For example, the 3rd Generation Partnership Project (3GPP), which is a standard organization, supports D2D communication through a sidelink (or a PC5 interface). The necessity of the D2D communication is expected to increase in specific situations for massive group communications such as catastrophic situations or situations related to public safety.

The above information is presented as background information only to assist with an understanding of the disclosure. No determination has been made, and no assertion is made, as to whether any of the above might be applicable as prior art with regard to the disclosure.

SUMMARY

Mobile electronic devices supporting D2D communication may be referred to as a terminal or user equipment (UE). Terminals may be synchronized with each other to perform D2D communication. For example, if a terminal detects an out of coverage (OOC) state in a D2D mode, the terminal may transmit and/or receive a synchronization signal using a specified resource in order to synchronize with another terminal. When the synchronization signal transmitted from the terminal is received by the other terminal, the other terminal that has received the synchronization signal may select the terminal that has transmitted the synchronization signal as a terminal serving as a reference for synchronization. The terminal serving as a reference for synchronization may be referred to as synchronization "reference UE" or "SyncRef UE".

In a D2D communication environment, two or more terminals may transmit synchronization signals at the same timing or in time periods at least partially overlapping each other. In the D2D mode, a terminal operates through half-duplex communication in which simultaneous transmission and reception of signals cannot be performed at the same time. Thus, when two or more terminals having overlapping transmission time periods of synchronization signals, the two or more terminals may fail to receive the synchronization signals from each other. Terminals that have failed to receive the synchronization signal may fail to perform synchronization and D2D communication.

Aspects of the disclosure are to address at least the above-mentioned problems and/or disadvantages and to provide at least the advantages described below. Accordingly, an aspect of the disclosure is to provide a method for two or more terminal that transmit a signal to synchronize.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit, a memory, and a processor operatively connected to the communication circuit and the memory, wherein the processor may be configured to detect an event for transmitting a synchronization signal in a device-to-device (D2D) mode, start a first timer stored in the memory, transmit a synchronization signal at a specified first timing in a first time period in which the first timer operates and attempt to receive a synchronization signal at a specified second timing in the first time period, detect that a synchronization signal and a valid data packet have not been received until the first timer expires, and attempt to receive a synchronization signal at a timing corresponding to the specified first timing in a second time period after the first timer expires.

In accordance with another aspect of the disclosure, an electronic device is provided. The electronic device includes a communication circuit, a memory, and a processor operatively connected to the communication circuit and the memory, wherein the processor may be configured to attempt to receive a synchronization signal at a specified timing in a plurality of time periods in a D2D mode, select at least one synchronization signal having lowest signal strength among a plurality of synchronization signals corresponding to the plurality of time periods, and select a SyncRef UE based on signal strength of the plurality of synchronization signals except for the selected at least one synchronization signal.

In accordance with an aspect of the disclosure, a method of an electronic device is provided. The method includes detecting an event for transmitting a synchronization signal in a D2D mode, starting a first timer, transmitting a synchronization signal at a specified first timing in a first time period in which the first timer operates and attempting to receive a synchronization signal at a specified second timing in the first time period, detecting that a synchronization signal and a valid data packet have not been received until the first timer expires, and attempting to receive a synchronization signal at a timing corresponding to the specified first timing in a second time period after the first timer expires.

According to embodiments of the disclosure, an electronic device (or terminal) can be successfully synchronized with another electronic device in a D2D environment.

According to embodiments of the disclosure, an electronic device can reduce power consumption due to repetition of synchronization operations.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Figure 1:
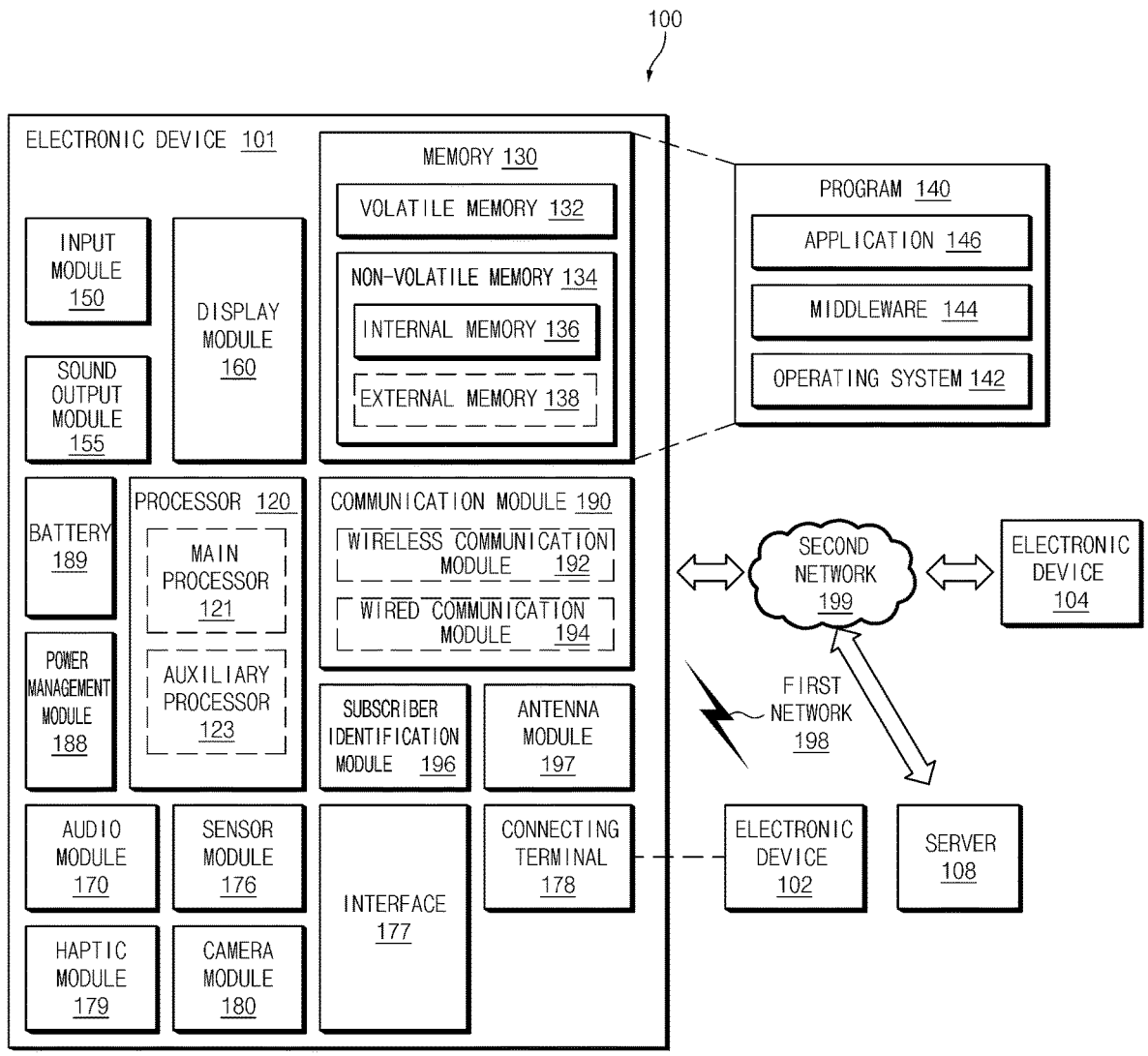
FIG. 1 is a block diagram illustrating an electronic device in a network environment according to an embodiment of the disclosure.

FIG. 1 is a block diagram illustrating an electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
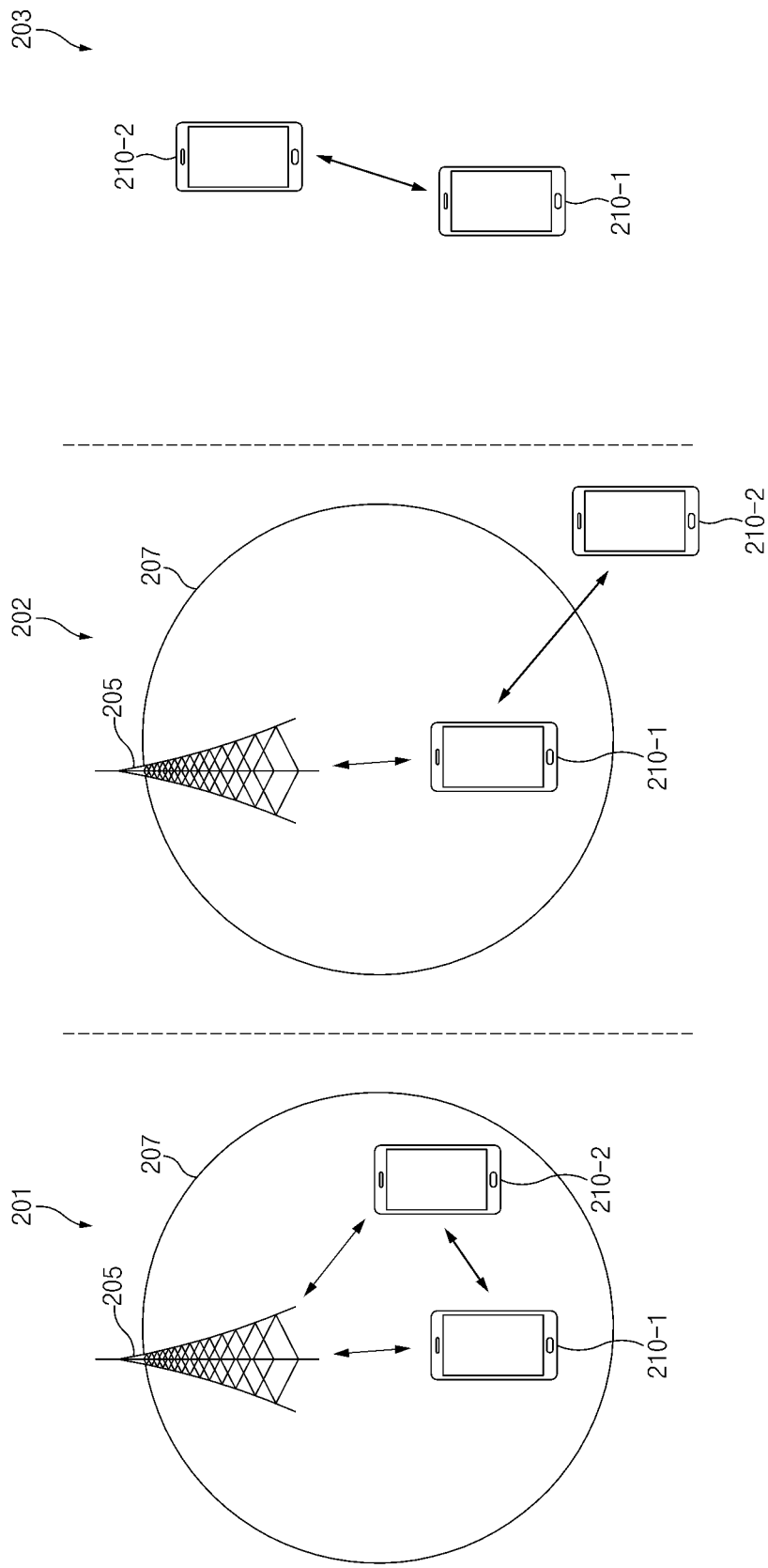
FIG. 2 illustrates a D2D communication environment according to an embodiment of the disclosure.

FIG. 2 illustrates D2D communication environments 201, 202, and 203 according to an embodiment of the disclosure. In various embodiments of the disclosure, D2D communication may include ProSe communication and/or sidelink communication.

According to an embodiment, the ProSe communication may represent D2D communication between terminals in proximity through an evolved UMTS terrestrial radio access network (E-UTRAN) communication path established between two or more terminals (e.g., a first electronic device 210-1 and a second electronic device 210-2).

According to an embodiment, the sidelink communication may represent D2D communication in which two or more terminals (e.g., the first electronic device 210-1 and the second electronic device 210-2) for implementing the ProSe communication may communicate with each other without eNodeB using an E-UTRAN direct wireless signals. For example, the sidelink communication may provide various types of channels (e.g., logical channel, transport channel, physical channel) between terminals. For example, two or more terminals may transmit control information through a physical sidelink control channel (PSCCH) (or scheduling assignment (SA)) defined by the sidelink communication, and may transmit data through a physical sidelink shared channel (PSSCH) (or data channel between terminals).

According to an embodiment, the D2D communication environment may further include a vehicle-to-vehicle (V2V) environment or a vehicle-to-everything (V2X) communication environment.

Referring to FIG. 2, the first electronic device 210-1 and the second electronic device 210-2 may execute functions that are the same as or similar to those of the electronic device 101 of FIG. 1 and may include components that are the same as or similar to those of the electronic device 101 of FIG. 1. For example, the first electronic device 210-1 and the second electronic device 210-2 may be various types of mobile devices or portable devices capable of performing cellular communication with a base station 205 (e.g., eNodeB). The first electronic device 210-1 and the second electronic device 210-2 may also be referred to as a "terminal" or "user equipment (UE)". Furthermore, the first electronic device 210-1 and the second electronic device 210-2 may include a communication circuit (e.g., the wireless communication module 192 of FIG. 1) for performing D2D communication, a memory (e.g., the memory 130 of FIG. 1), and a processor (e.g., the processor 120 of FIG. 1) operatively connected to the communication circuit and the memory. According to an embodiment, the first electronic device 210-1 and the second electronic device 210-2 may further include a protocol stack for performing D2D communication and/or a universal integrated circuit card (UICC) (e.g., the subscriber identification module 196 of FIG. 1) for performing D2D communication.

According to an embodiment, the protocol stack for performing D2D communication may be performed by an application processor (e.g., the main processor 121 of FIG. 1) and/or communication processor (e.g., the auxiliary processor 123 or wireless communication module 192 of FIG. 1) of the first electronic device 210-1 and the second electronic device 210-2. For example, the protocol stack may include an application layer, an Internet protocol (IP) layer, a packet data convergence protocol (PDCP) layer, a radio resource control (RRC) layer, a radio link control (RLC) layer, a medium access control (MAC) layer, and a physical (PHY) layer. Furthermore, the protocol stack may further include a ProSe protocol stack. In various embodiments of the disclosure, the term "upper layer" may refer to an application layer. The application layer may include at least one application for utilizing a D2D communication service. For example, the application layer may include at least one of an application for switching the electronic device 101 to a D2D mode and/or an application for a group call. For example, the application layer and the IP layer of the protocol stack may be executed by an application processor (e.g., the main processor 121 of FIG. 1). The PDCP layer to the PHY layer of the protocol stack may be executed by a communication processor (e.g., the auxiliary processor 123 or wireless communication module 192 of FIG. 1).

According to an embodiment, the UICC for performing D2D communication may comprise information (e.g., public land mobile network (PLMN)) for performing D2D communication.

According to an embodiment, a scenario of a D2D communication environment may include an in-coverage environment 201, a partial coverage environment 202, and an out of coverage (00C) environment 203, and scenarios other than the illustrated D2D communication environments may be further included.

According to an embodiment, in the in-coverage environment 201, the first electronic device 210-1 and the second electronic device 210-2 may be positioned within a coverage 207 (or cell) of the base station 205. In this case, the first electronic device 210-1 and the second electronic device 210-2 may perform D2D communication using a portion of radio resources (e.g., resource block) provided in a cell of the base station 205. For example, the first electronic device 210-1 or the second electronic device 210-2 may use a frequency resource (e.g., subframe on an uplink (UL) frequency of frequency division duplexing (FDD)) of a UL or a subframe (e.g., subframe allocated to a UL in time division duplexing (TDD)) of a UL used in 4th generation (4G) or 5th generation (5G) communication defined by 3GPP. In the in-coverage environment, a radio resource used by the first electronic device 210-1 and the second electronic device 210-2 may be controlled (or allocated) by the base station 205.

According to an embodiment, in the partial coverage environment 202, the first electronic device 210-1 may be positioned within the coverage 207 of the base station 205, while the second electronic device 210-2 is positioned outside the coverage 207. In this case, the first electronic device 210-1 may be connected with the base station 205 through a Uu interface, and the first electronic device 210-1 and the second electronic device 210-2 may be connected through a PC5 interface. The first electronic device 210-1 may transmit, to the second electronic device 210-2, radio resource information allocated by the base station 205, and the first electronic device 210-1 and the second electronic device 210-2 may perform D2D communication using shared radio resource information.

According to an embodiment, in the OOC environment 203, the first electronic device 210-1 and the second electronic device 210-2 may be positioned outside the coverage 207 of the base station 205. In this case, the first electronic device 210-1 and the second electronic device 210-2 are unable to be allocated a radio resource by the base station 205 and thus may attempt to perform D2D communication based on arbitrary or stored radio resource allocation information. For example, the first electronic device 210-1 and the second electronic device 210-2 may store radio resource allocation information (e.g., allocation policy, allocation protocol) in a memory (e.g., the memory 130 of FIG. 1) or UICC. The first electronic device 210-1 (or the second electronic device 210-2) may detect an OOC state through the following operation.

For example, the first electronic device 210-1 (e.g., communication processor) may be requested to perform D2D communication from an upper layer (e.g., application layer). For example, when an application for D2D communication is installed on the first electronic device 210-1, a communication circuit (e.g., the wireless communication circuit of FIG. 1) configured to perform wireless communication may be requested to perform D2D communication from the installed application. In response to the request for execution of D2D communication, the communication circuit of the first electronic device 210-1 may identify whether a specified frequency for performing D2D communication is existing. The specified frequency may comprise, for example, a disaster network frequency or public safety LTE (PS-LTE) frequency. When the specified frequency is not present, the first electronic device 210-1 may determine that the first electronic device 210-1 is in an OOC state.

According to an embodiment, when it is determined that the first electronic device 210-1 is in the OOC state, the first electronic device 210-1 may attempt to detect a synchronization signal. When the synchronization signal is detected, the first electronic device 210-1 may perform a time and frequency synchronization process based on the detected synchronization signal. When a plurality of synchronization signals are received, the first electronic device 210-1 may obtain all of pieces of synchronization related information for each reception link by repeatedly performing the above operation for each synchronization signal and synchronization information. Thereafter, the first electronic device 210-1 may perform a synchronization process by selecting one synchronization signal or based on a plurality of synchronization signals.

According to an embodiment, when the D2D synchronization signal is not detected for a certain time, the first electronic device 210-1 itself may function as a synchronization transmission device to play a role similar to that of a base station. Here, the first electronic device 210-1 may periodically or aperiodically transmit a D2D synchronization signal and synchronization information through a preconfigured D2D synchronization channel, and surrounding out-of-coverage terminals (e.g., the second electronic device 210-2) may be synchronized, through the same operation, with the first electronic device 210-1 operating as a synchronization transmission device.

Figure 3:
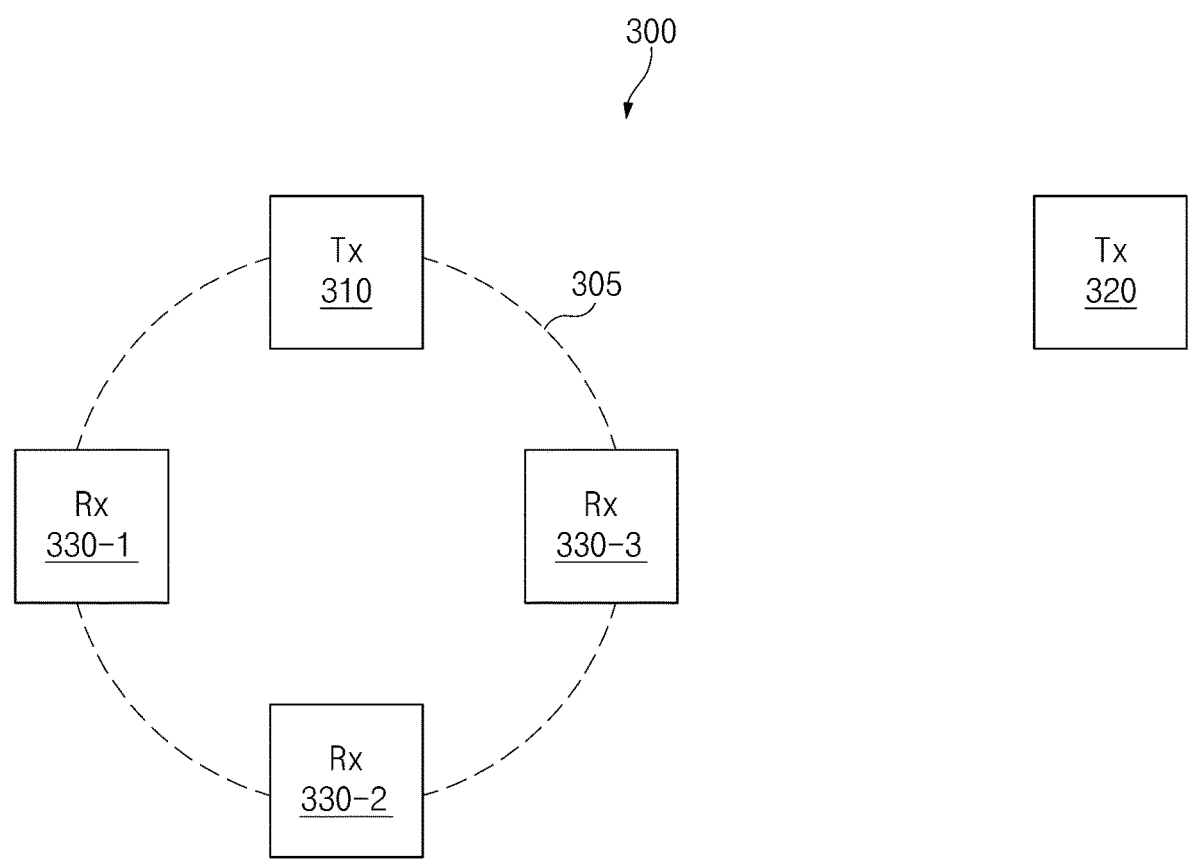
FIG. 3 illustrates a group call in a D2D communication environment according to an embodiment of the disclosure.

FIG. 3 illustrates a synchronized group 305 in a D2D communication environment 300 according to an embodiment of the disclosure. The D2D communication environment 300 illustrated in FIG. 3 may be an example of the OOC environment 203 of FIG. 2. The devices 310, 320, 330-1, 330-2, or 330-3 illustrated in FIG. 3 may execute functions that are the same as or similar to those of the electronic device 101 of FIG. 1 and may include components that are the same as or similar to those of the electronic device 101 of FIG. 1.

Referring to FIG. 3, in the D2D communication environment 300 according to an embodiment, a first synchronization transmission device 310 (e.g., the first electronic device 210-1 or second electronic device 210-2 of FIG. 2) may be included in one synchronized group 305 together with synchronization reception (Sync Rx, or Rx) devices 330-1, 330-2, and 330-3. For example, at least one electronic device 330-1, 330-2, and 330-3 synchronized with the first synchronization transmission device 310 by receiving a synchronization signal transmitted from the first synchronization transmission device 310 may be included in the synchronized group 305 as a synchronization reception device. Only the first synchronization transmission device 310 may transmit a synchronization signal within the synchronized group 305. The first synchronization transmission device 310 may operate in a synchronization transmission mode until receiving a synchronization signal transmitted from another electronic device (e.g., second synchronization transmission device 320). At least one electronic device 330-1, 330-2, and 330-3 may be synchronized by receiving a synchronization signal transmitted from the first synchronization transmission device 310 and selecting the first synchronization transmission device 310 as a "SyncRef UE". In various embodiments of the disclosure, the term "synchronization transmission mode" may represents a state configured to perform an operation of transmitting a synchronization signal like the first synchronization transmission device 310. Furthermore, the term "synchronization reception mode" may represent a state configured to receive a synchronization signal from another electronic device, select the device that has transmitted the synchronization signal as a SyncRef UE, and perform synchronization like the at least one electronic device 330-1, 330-2, and 330-3.

According to an embodiment, when an 00C state is detected, the second synchronization transmission device 320 may attempt synchronization in order to form a synchronized group with other electronic devices. For example, when the second synchronization transmission device 320 receives a synchronization signal from the first synchronization transmission device 310 included in the synchronized group 305, the second synchronization transmission device 320 may be added to the synchronized group 305 and may operate as a synchronization reception device. For another example, when another electronic device (not shown) receives a synchronization signal transmitted from the second synchronization transmission device 320, the second synchronization transmission device 320 may establish a new synchronized group with the other electronic device (not shown). In this case, the second synchronization transmission device 320 may be selected as a SyncRef UE.

Figure 4:
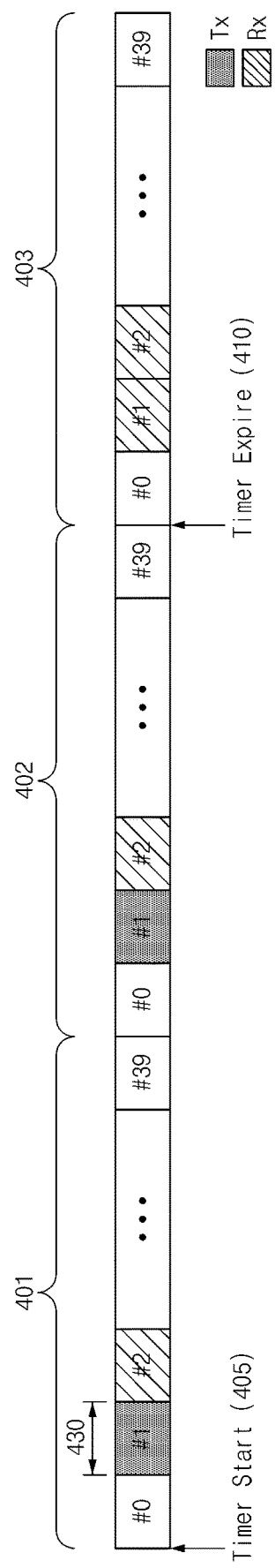
FIG. 4 illustrates a resource block for synchronization according to an embodiment of the disclosure.

FIG. 4 illustrates a resource block for synchronization according to an embodiment of the disclosure.

Referring to FIG. 4, a first time period 401, a second time period 402, and a third time period 403 may represent resources (e.g., time) used for D2D communication. The electronic device 101 (e.g., the synchronization transmission device 310 or 320 of FIG. 3) may periodically perform an operation for the D2D communication at every specified time period. For example, the electronic device 101 may be configured to transmit a synchronization signal corresponding to a size of one subframe at an interval of 40 ms. The synchronization signal may include, for example, a primary sidelink synchronization signal (PSSS), secondary sidelink synchronization signal (SSSS), physical sidelink broadcast channel (PSBCH), or demodulation reference signal (DMRS). The structure of a resource block for the first time period 401 described below may also be applied to the second time period 402 and the third time period 403.

The first time period 401 may be referred to as a sidelink control (SC) period. The first time period 401 may include 40 subframes (e.g., #0, #1, . . . , #39). A size of one subframe (e.g., 430) may be 1 ms. Subframes included in the first time period 401 may be used in one of physical sidelink discovery channel (PSDCH), PSCCH, PSSCH, physical uplink shared channel (PUSCH), and/or PSBCH. The PSDCH may be used for electronic devices to notify presence thereof to surroundings. The PSCCH may be used to transmit control information for D2D communication. The PSSCH may be used to transmit data for D2D communication. The PUSCH may be used to transmit signal data or user data from the electronic device 101 to the base station 205. The PSBCH may be used to synchronize radio resources between electronic devices performing D2D communication.

In response to detection of an OOC state (or in response to failure of detection of a synchronization signal after an OOC state is detected), the electronic device 101 may attempt synchronization at a specified timing (or subframe) in a specified time period. For example, the electronic device 101 may transmit a synchronization signal in a number one subframe #1 in the first time period 401, and may attempt to receive a synchronization signal in a number two subframe #2. A subframe number used in transmitting or receiving a synchronization signal within the first time period 401 is not limited to the example illustrated in FIG. 4. Since D2D communication is performed based on half-duplex communication, the electronic device 101 that transmits a synchronization signal in a particular subframe (e.g., number one subframe #1) may be unable to receive a synchronization signal transmitted from another electronic device through the same subframe #1. If two or more electronic devices transmit a synchronization signal in at least partially overlapping time periods, the electronic devices may repeatedly fail to receive a synchronization signal from each other. For example, the synchronization transmission devices 310 and 320 of FIG. 3 may start synchronization at the same offset, and may transmit a synchronization signal using the same subframe number (e.g., #1) in the first time period 401. The synchronization transmission devices 310 and 320 may attempt to receive a synchronization signal at the same subframe number (e.g., #2) but may fail to receive a synchronization signal. If reception of a synchronization signal fails (e.g., if there is no received synchronization signal), the synchronization transmission devices 310 and 320 may repeat a synchronization attempt at every specified time period. Accordingly, the synchronization transmission devices 310 and 320 may be unable to transmit/receive data due to failure of synchronization. FIG. 4 illustrates an example in which synchronization signals of the synchronization transmission devices 310 and 320 are transmitted in the same subframe. However, if a time resource on which a synchronization signal is transmitted is used in more specific units (e.g., symbol) included in a subframe, time periods in which synchronization signals of the synchronization transmission devices 310 and 320 are transmitted may be at least partially overlapped each other, even time periods for the synchronization signals are not the same.

According to an embodiment, an electronic device (e.g., the electronic device 101 of FIG. 1) may operate in the synchronization transmission mode like the synchronization transmission device 310 or 320 of FIG. 3. The electronic device 101 may start a specified timer (e.g., first timer), and may attempt to receive a synchronization signal instead of transmitting a synchronization signal in a time period after the timer expires.

According to an embodiment, the specified timer may be used for the electronic device 101 to determine whether a synchronization signal or valid a data packet (e.g., a data packet for a group call) is received from another electronic device before attempting to receive a synchronization signal in a synchronization signal transmission period. For example, when the first synchronization transmission device 310 does not transmit a synchronization signal in a synchronized group (e.g., 305 of FIG. 3) including the first synchronization transmission device 310, communication in the synchronized group may be interrupted, and thus the first synchronization transmission device 310 may be unable to attempt to receive a synchronization signal in a synchronization transmission period. Therefore, when a valid data packet is received before the timer expires, the first synchronization transmission device 310 may reset the timer and maintain the synchronization transmission mode. For another example, since the electronic device 101 may switch to the synchronization reception mode upon receiving a synchronization signal from another electronic device, it may be unnecessary to change to a synchronization signal reception period. Accordingly, when a synchronization signal is received before the timer expires, the electronic device 101 may reset the timer and switch to the synchronization reception mode.

For example, the electronic device 101 may start the timer at a start offset 405 of the first time period 401. The electronic device 101 may attempt synchronization while the timer is operating. For example, the electronic device 101 may transmit a synchronization signal in the number one subframe #1 in the first time period 401 and the second time period 402, and may attempt to receive a synchronization signal in the number two subframe #2. When the timer expires at an end offset 410 of the second time period 402, the electronic device 101 may attempt to receive a synchronization signal without transmitting a synchronization signal in the number one subframe #1 in the third time period 403 after the second time period 402 in which the timer has expired.

The timer may operate for a specified time. For example, a specified time value of the first timer may represent a time from a start timing to expiration. In an example, the specified time value may be determined based on SC Period that is a length of each of the first time period 401 and the second time period 402. For example, the specified time value may be determined as 80 ms that is two times the SC Period. Although FIG. 4 illustrates that the time value of the timer is the length of the first time period 401 and the second time period 402, the time value of the timer is not limited to the example illustrated in FIG. 4. For example, the time value of the timer may be the length of the first to third time periods 401 to 403. For another example, the timer may not necessarily expire at an end offset (e.g., 410) of a particular time period and may expire in a middle of the corresponding time period (e.g., number two subframe #2 of the second time period 402).

According to an embodiment, if two electronic devices (the synchronization transmission devices 310 and 320 of FIG. 3) attempting synchronization have the same time value of the timer, the two electronic devices may attempt to receive a synchronization signal in the same time period (e.g., third time period 403). Therefore, in order to prevent this case, the time value of the timer of each electronic device according to an embodiment may be randomly set. For example, the time value of the timer of each electronic device may be set to arbitrary multiples (e.g., by a factor of any number among 1 to 5) of the SC Period.

Although FIG. 4 illustrates an embodiment in which the electronic device 101 attempts to receive a synchronization signal in a time period (e.g., third time period 403) immediately after the timer expires, the embodiment is not limited thereto. For example, the electronic device 101 may attempt to receive a synchronization signal in a time period (not shown) after N-th (N is a natural number) time period from the second time period 402 in which the timer has expired.

Figure 5:
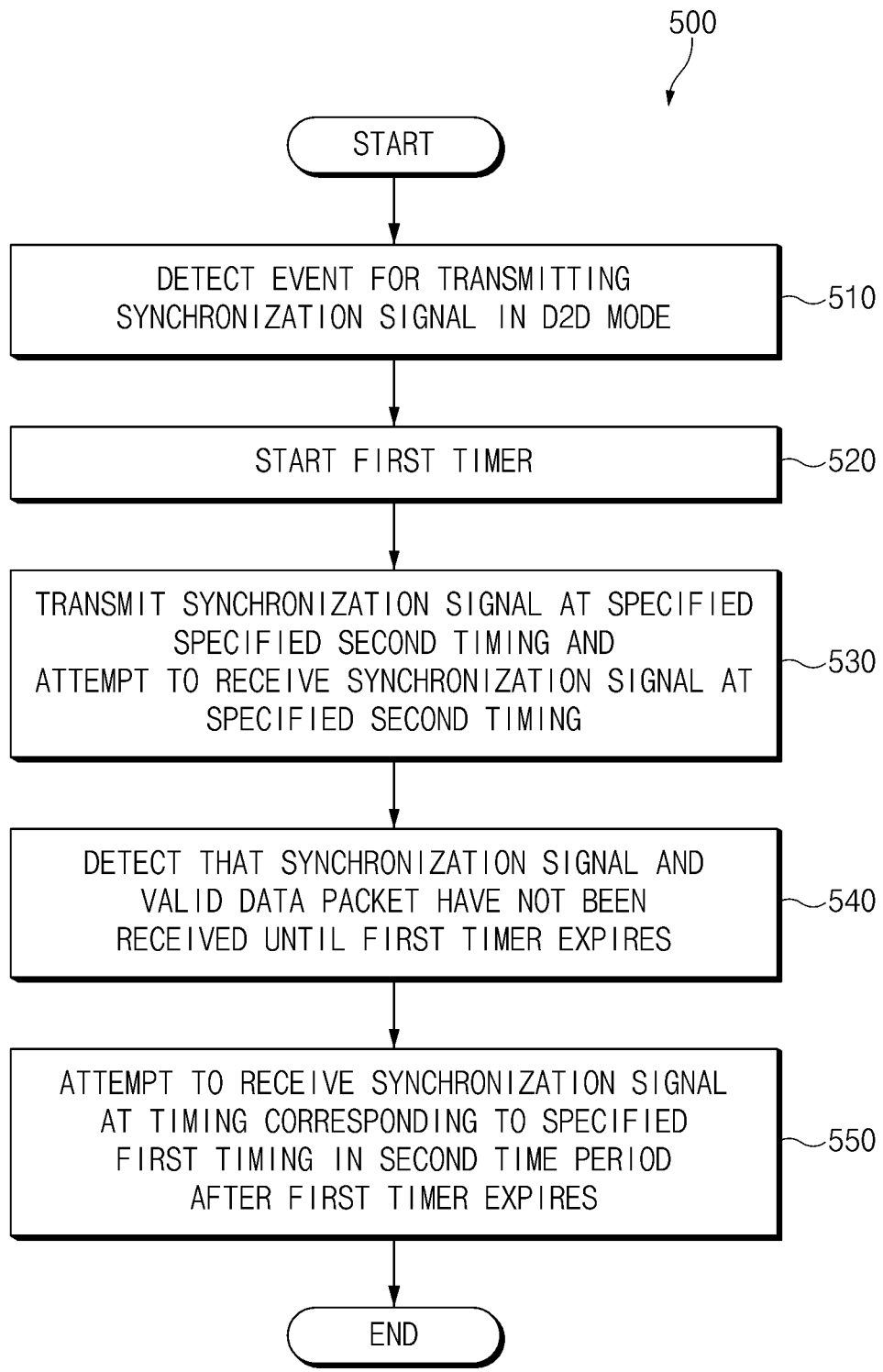
FIG. 5 is a flowchart illustrating operation of an electronic device for synchronization according to an embodiment of the disclosure.

FIG. 5 is a flowchart 500 illustrating operation of an electronic device for synchronization according to an embodiment of the disclosure. The operations in the operation flowchart described below may be performed by at least one component included in an electronic device (e.g., the electronic device 101 of FIG. 1). For example, operations 510 to 550 may be performed through at least one of the processor 120 and/or the wireless communication module 192 (or communication circuit) of FIG. 1.

Referring to FIG. 5, according to an embodiment, in operation 510, the electronic device 101 (e.g., the auxiliary processor 123 or wireless communication module 192 of FIG. 1) may detect an event for transmitting a synchronization signal in a D2D mode. In an embodiment of the disclosure, the term "D2D mode" may represent a state of attempting to connect to or being connected to a network (e.g., emergency disaster network) for D2D communication (e.g., ProSe, sidelink, V2V, V2X) and/or a state of attempting to connect or being connected through a channel (e.g., sidelink channel) for D2D communication. The electronic device 101 may switch to the D2D mode based on a request (e.g., D2D mode ON) generated in an upper layer. Alternatively, the electronic device 101 may include a dedicated terminal that operates in the D2D mode.

According to an embodiment, the event for transmitting a synchronization signal may include detection of at least one of failure of reception of a synchronization signal in the OOC state or switching from the synchronization reception mode to the synchronization transmission mode. When a specified frequency is not present in the D2D mode, the electronic device 101 may detect that the electronic device 101 is in the OOC state. In an embodiment, in the OOC state, the electronic device 101 may fail to receive (or detect) a synchronization signal while searching for a synchronization signal. If the electronic device 101 fails to receive a synchronization signal, the electronic device 101 may operate in the synchronization signal transmission mode. In another embodiment, the electronic device 101 may detect that the electronic device 101 switches from the synchronization reception mode to the synchronization transmission mode. For example, the electronic device 101 may switch to the synchronization transmission mode if strength (e.g., sidelink reference signal received power (S-RSRP)) of a signal received by the electronic device 101 operating in the synchronization reception mode after selecting a SyncRef UE is less than a specified value (e.g., syncThresOoC).

According to an embodiment, in operation 520, the electronic device 101 may start a first timer. A time value for the first timer may be pre-stored in a memory (e.g., the memory 130 of FIG. 1) of the electronic device.

According to an embodiment, in operation 530, the electronic device 101 may transmit a synchronization signal at a specified first timing (e.g., the number one subframe #1 of FIG. 4) in a first time period (e.g., the first time period 401 of FIG. 4) and may attempt to receive a synchronization signal at a specified second timing (e.g., the number two subframe #2 of FIG. 4) while the first timer is operating. In embodiments, the electronic device 101 may repeatedly transmit and attempt to receive a synchronization signal during a plurality of time periods.

According to an embodiment, in operation 540, the electronic device 101 may detect that a synchronization signal and a valid data packet have not been received until the first timer expires. The valid data packet, for example, may be a data packet delivered in a D2D communication environment. For example, the valid data packet may include at least one of ProSe UE identifier (ID), ProSe group ID, and/or discovery message.

According to an embodiment, in operation 550, the electronic device 101 may attempt to receive a synchronization signal at a timing (e.g., the number one frame #1 of FIG. 4) corresponding to the specified first timing in a second time period (e.g., the third time period 403 of FIG. 4) after the first timer expires. Through the above-described operations, the electronic device 101 may stably perform synchronization in a D2D communication environment.

Figure 6:
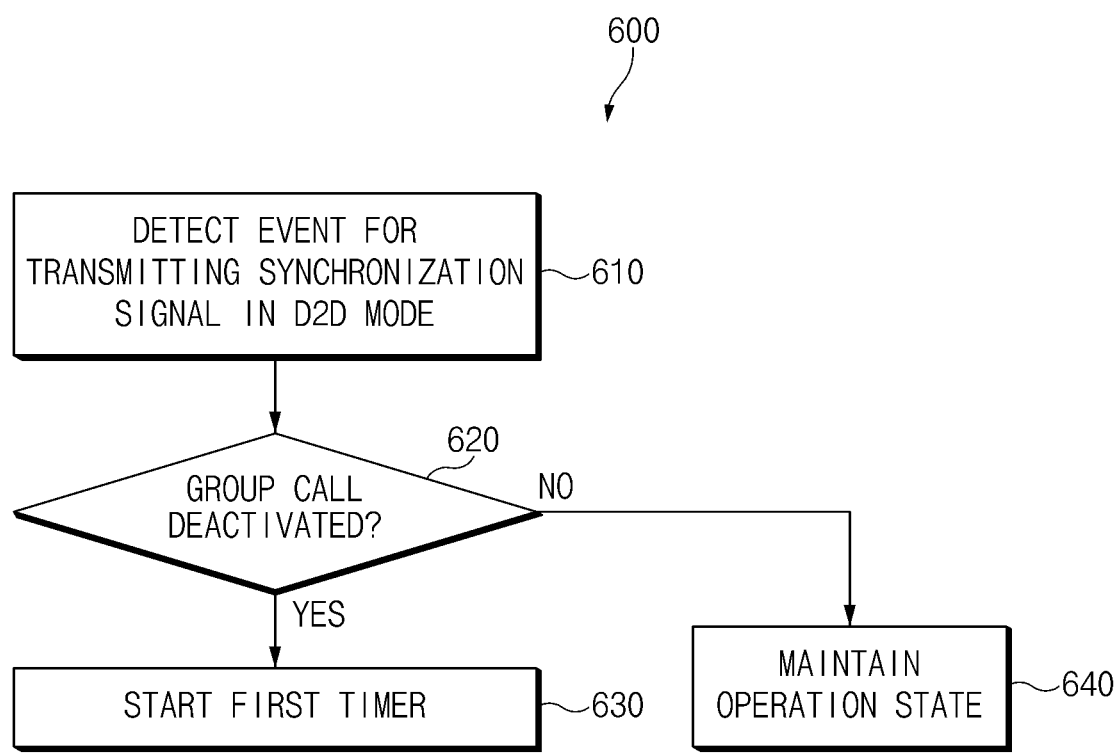
FIG. 6 is a flowchart illustrating operations of an electronic device for starting a first timer according to an embodiment of the disclosure.

FIG. 6 is a flowchart 600 illustrating operations of an electronic device for starting a first timer according to an embodiment of the disclosure. The operations illustrated in FIG. 6 may be an embodiment of operations 510 and 520 of FIG. 5.

Referring to FIG. 6, according to an embodiment, in an operation 610, the electronic device 101 may detect an event for transmitting a synchronization signal in the D2D mode (e.g., operation 510 of FIG. 5).

According to an embodiment, in an operation 620, the electronic device 101 may identify whether a group is deactivated. The group call may be a group call used in services for various purposes (e.g., public safety, V2X) that may occur through ProSe call D2D (or ProSe) communication, and, for example, may also be referred to as an off-network group call used in a mission critical push to talk (MCPTT).

According to an embodiment, if the electronic device 101 has no history of transmission/reception of a message related to the group call for a specified time or there is no pre-established group call in an upper layer, the electronic device 101 may determine that the group call is deactivated (operation 620—YES), and may start the first timer in an operation 630 (e.g., operation 520 of FIG. 5). For example, when the group call (e.g., MCPTT call) is in "S1: start-stop" state, the electronic device 101 may determine that the group call is deactivated.

According to an embodiment, if the electronic device 101 has a history of transmission/reception of a message related to the group call for a specified time, or there is a pre-established group call in an upper layer, or the group call is not in the "S1: start-stop" state (operation 620—NO), the group call may be in a temporarily stopped state while the electronic device 101 is operating as a synchronization transmission device. In this case, in operation 640, the electronic device 101 may maintain an operation state of the electronic device 101 without starting the first timer.

Figure 7:
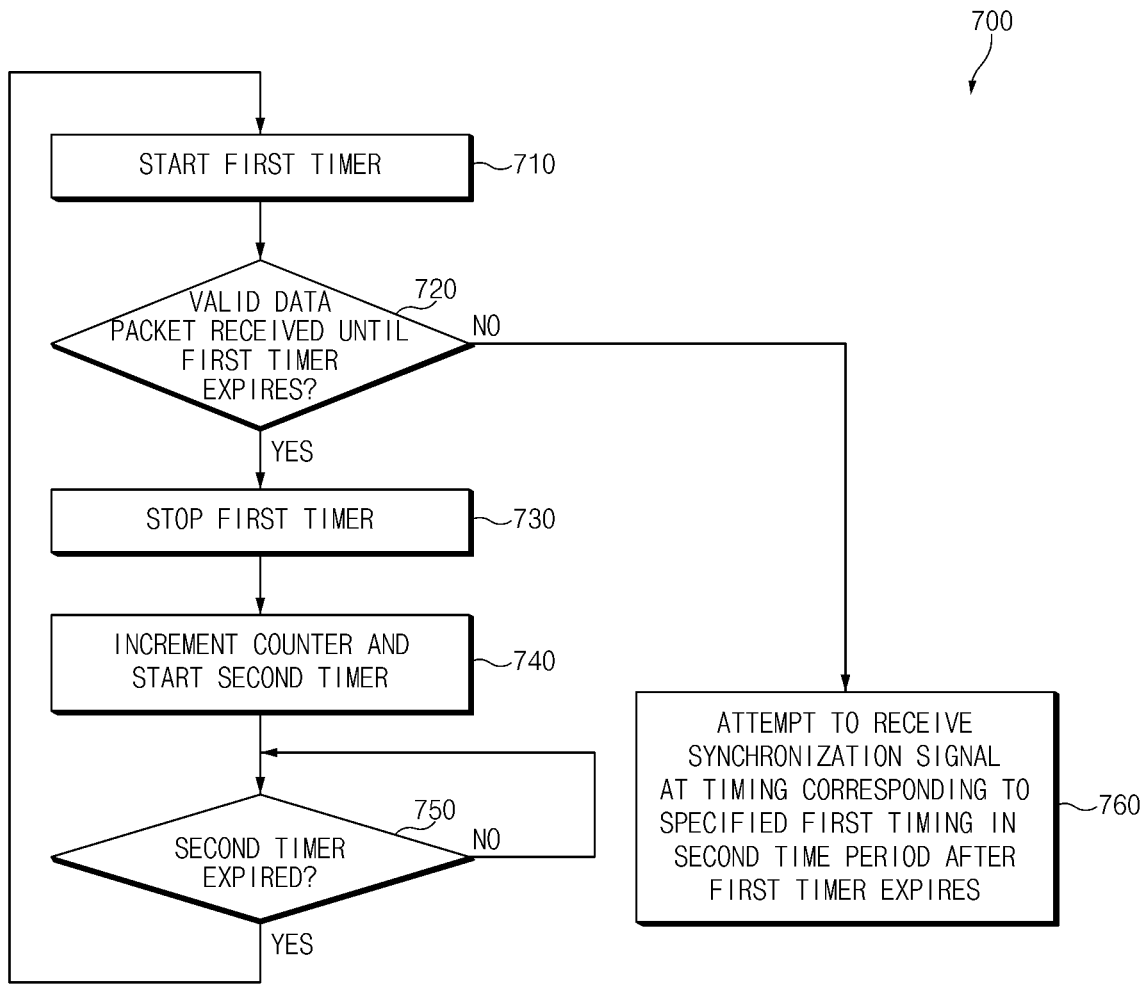
FIG. 7 is a flowchart illustrating operations of an electronic device using a second timer according to an embodiment of the disclosure.

FIG. 7 is a flowchart 700 illustrating operations of an electronic device using a second timer according to an embodiment of the disclosure. The operations illustrated in FIG. 7 may be an embodiment of operations 520 to 550 of FIG. 5.

Referring to FIG. 7, according to an embodiment, in an operation 710, the electronic device 101 may start the first timer (e.g., operation 520 of FIG. 5).

According to an embodiment, in an operation 720, the electronic device 101 may identify whether a valid data packet is received until the first timer expires. When a valid data packet is received (operation 720—YES), this may indicate that the electronic device 101 is a device which is participating in a D2D service by establishing the synchronized group 305 like the first synchronization transmission device 310 of FIG. 3, and thus the electronic device 101 may not attempt to receive a synchronization signal (or maintain an operation of the first synchronization transmission device 310) at a timing for transmitting a synchronization signal so as to continue to play a role of the first synchronization transmission device 310 in D2D communication. In this case, the electronic device 101 may stop (or reset) the first timer in operation 730.

According to an embodiment, non-reception of valid data until the first timer expires may indicate that the electronic device 101, like the second synchronization transmission device 320 of FIG. 3, is a device which does not establish a synchronized group, and, therefore, when a valid data packet is not received (the operation 720—NO), the electronic device 101 may attempt to receive a synchronization signal at a timing corresponding to the first specified timing in a second time period after the first timer expires in operation 760 (e.g., the operation 550 of FIG. 5).

According to an embodiment, in an operation 740, the electronic device 101 may increment a counter associated with the second timer and may start the second timer. The second timer may be a timer indicating a time until the electronic device 101 restarts the first timer. Even if the electronic device 101 is a synchronization transmission device included in a synchronized group, the synchronized group may be released later (e.g., synchronization reception device that has selected the synchronization transmission device as a SyncRef UE may disappear), and thus the electronic device 101 may restart the first timer after the second timer expires. For example, the electronic device 101 may identify whether the second timer expires in operation 750, and, if the second timer expires (the operation 750—YES), may restart the first timer in operation 710. The counter may be a value for increasing a time length of the second timer. For example, when the counter increments, the time length of the second timer may increase at a specified rate (e.g., double). The electronic device 101 may reduce power consumption due to repetition of operations 710 to 730 by increasing the time length of the second timer through the counter.

Figure 8:
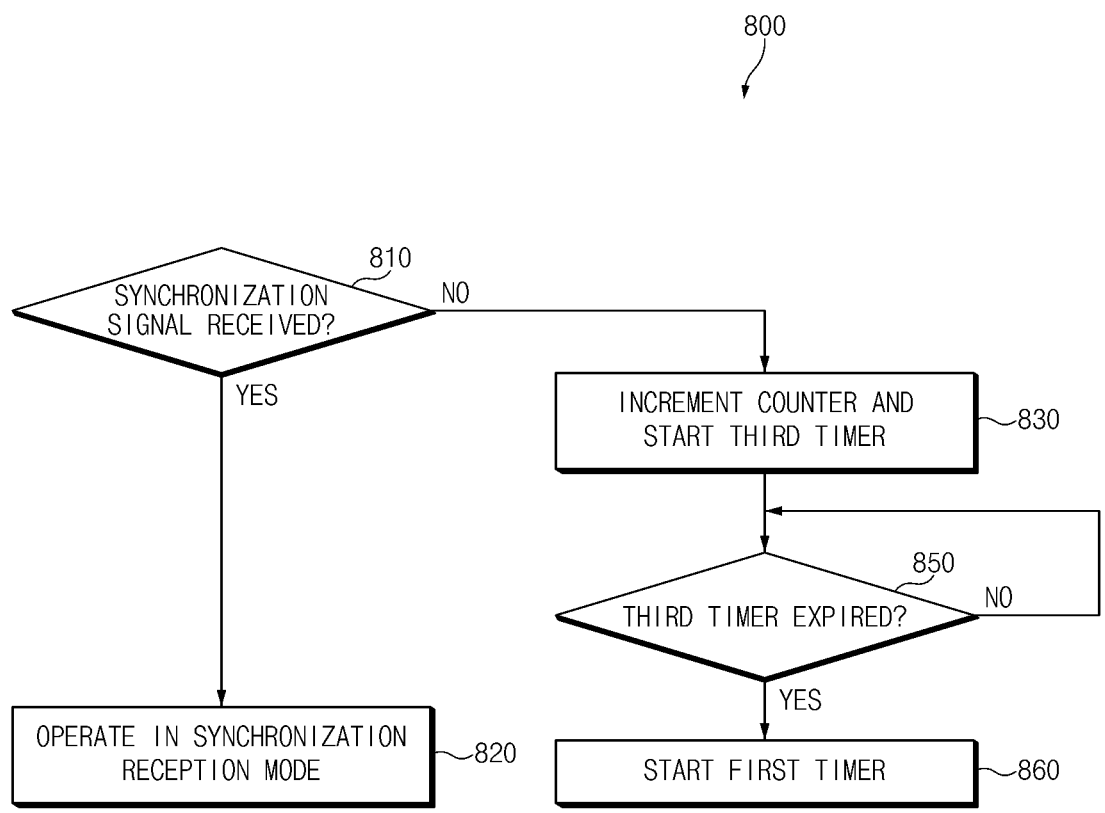
FIG. 8 is a flowchart illustrating operations of an electronic device for operating in a synchronization reception mode according to an embodiment of the disclosure.

FIG. 8 is a flowchart 800 illustrating operations of an electronic device for operating in a synchronization reception mode according to an embodiment of the disclosure. The operations illustrated in FIG. 8 may be performed after the operation 550 of FIG. 5.

Referring to FIG. 8, in an operation 810, the electronic device 101 (e.g., the electronic device 101 of FIG. 1) may identify whether a synchronization signal is received. For example, the electronic device 101 may attempt to receive a synchronization signal at a timing (e.g., the number one frame #1 of FIG. 4) corresponding to the specified first timing in a second time period (e.g., the third time period 403 of FIG. 4) after the first timer expires, and may identify whether a synchronization signal is received normally.

According to an embodiment, if a synchronization signal is received (the operation 810—YES), the electronic device 101 may operate in the synchronization reception mode in an operation 820. For example, referring to FIG. 3, the electronic device 101 may operate like the synchronization reception device 330-1 and select the first synchronization transmission device 310 as a SyncRef UE based on a synchronization signal received from the first synchronization transmission device 310.

According to an embodiment, if a synchronization signal is not received (the operation 810—NO), the electronic device 101 may increment a counter associated with a third timer and start the third timer in an operation 830. The third timer may be a timer indicating a time until the electronic device 101 restarts the first timer. The reason for non-reception of a synchronization signal in the operation 810 may be that a distance between the electronic device 101 and an external electronic device cannot be reached by the synchronization signal. Therefore, the electronic device 101 may restart the first timer after the third timer expires in order to re-attempt synchronization. For example, the electronic device 101 may identify whether the third timer expires in an operation 850, and, if the third timer expires (the operation 850—YES), may restart the first timer in an operation 860 (e.g., the operation 520 of FIG. 5). The counter may be a value for increasing a time length of the third timer. For example, when the counter increments, the time length of the third timer may increase at a specified rate. The electronic device 101 may reduce power consumption due to repetition of operations 520 to 550 of FIG. 5 and operations 810, 830, and 850 by increasing the time length of the third timer through the counter.

Figure 9:
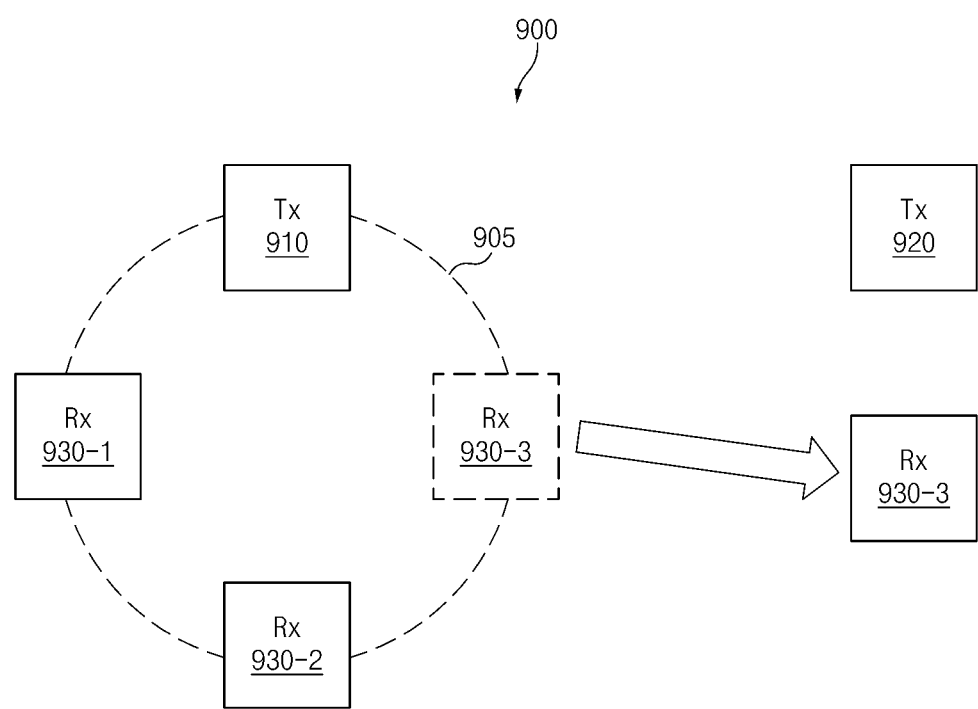
FIG. 9 illustrates another example of a group call in a D2D communication environment according to an embodiment of the disclosure.

FIG. 9 illustrates another example of a group call in a D2D communication environment 900 according to an embodiment of the disclosure. In the D2D communication environment 900 illustrated in FIG. 9, components having reference numbers (e.g., 310 and 910) that are the same as or similar to those of the components illustrated in FIG. 3 may execute functions that are the same as or similar to those of the components illustrated in FIG. 3. The devices 910, 920, 930-1, 930-2, or 930-3 illustrated in FIG. 9 may each execute functions that are the same as or similar to those of the electronic device 101 of FIG. 1 and may include components that are the same as or similar to those of the electronic device 101 of FIG. 1.

Referring to FIG. 9, synchronization reception devices 930-1, 930-2, or 930-3 (e.g., the synchronization reception devices 330-1, 330-2, or 330-3 of FIG. 3) according to an embodiment have mobility and thus may select or reselect a SyncRef UE according to a specified condition. The synchronization reception devices 930-1, 930-2, or 930-3 may select or reselect a SyncRef UE based on signal strength (e.g., sidelink reference signal received power (S-RSRP)) of a synchronization signal received from synchronization transmission devices 910 or 920 (e.g., the synchronization transmission device 310 or 320 of FIG. 3). For example, the synchronization reception devices 930-1, 930-2, or 930-3 may select, as a SyncRef UE, a synchronization transmission device having highest signal strength of a synchronization signal. For another example, if the signal strength of a synchronization signal of a current SyncRef UE is less than a threshold, the synchronization reception devices 930-1, 930-2, or 930-3 may select another synchronization transmission device as a SyncRef UE.

In an embodiment, the synchronization reception device 930-3 included in a synchronized group 905 may move closer to a second synchronization transmission device 920 than to a first synchronization transmission device 910. If the second synchronization transmission device 920 attempts to receive a synchronization signal at a first timing (e.g., number one subframe #1) according to the embodiments illustrated in FIGS. 4 and 5, the synchronization reception device 930-3 may be unable to normally receive a synchronization signal from the second synchronization transmission device 920. For example, referring to FIG. 4, signal strength of synchronization signals received from the second synchronization transmission device 920 in the number one subframe #1 of each of the first time period 401, the second time period 402, and the third time period 403 may be −70 dB, −70 dB, and −141 dB. The synchronization reception device 930-3 according to embodiments may reduce an influence due to operation of the second synchronization transmission device 920 by selecting or reselecting a SyncRef UE based on received synchronization signals except for a synchronization signal having lowest signal strength.

Figure 10:
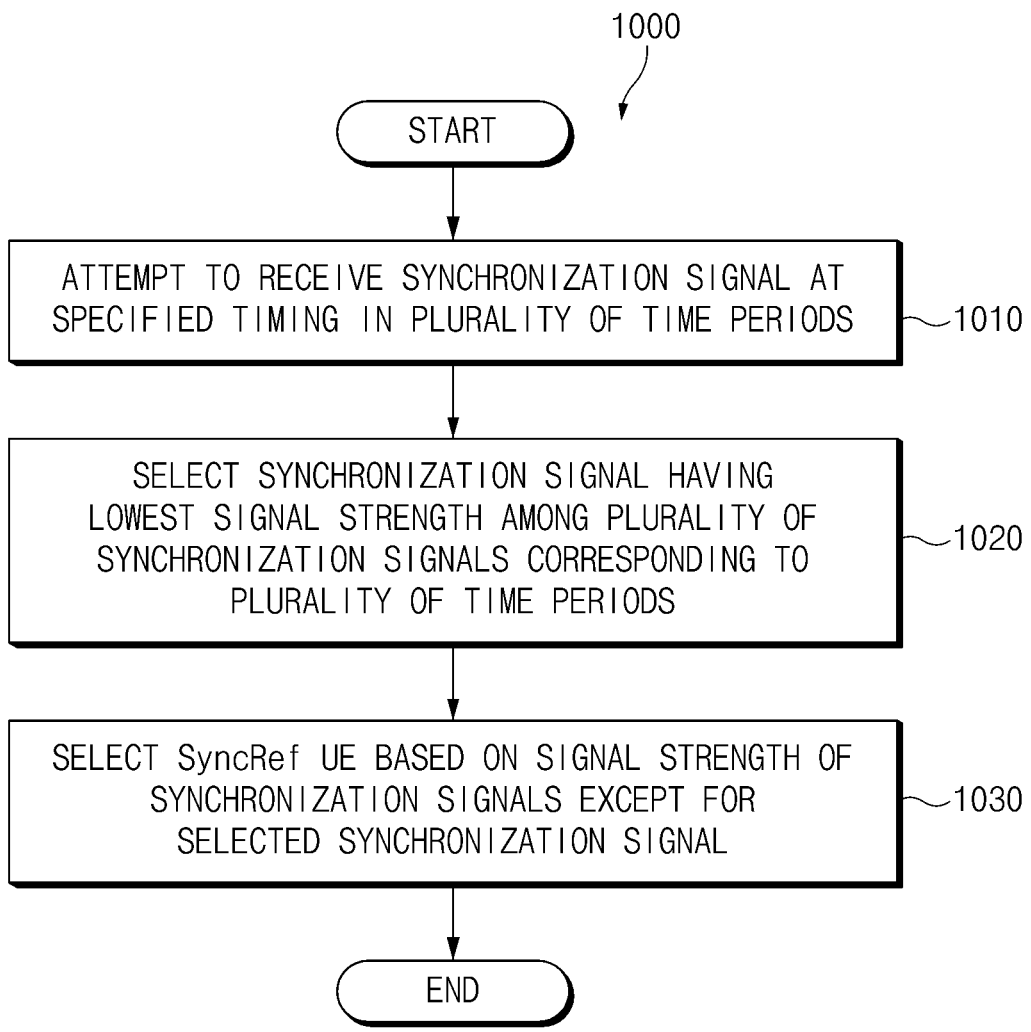
FIG. 10 is a flowchart illustrating operations of an electronic device for selecting a SyncRef UE according to an embodiment of the disclosure.

FIG. 10 is a flowchart 1000 illustrating operations of an electronic device for selecting a SyncRef UE according to an embodiment of the disclosure. The operations illustrated in FIG. 10 may be performed by the synchronization reception device 930-3 of FIG. 9. For example, a processor (e.g., the processor 120 of FIG. 1) included in the synchronization reception device may perform overall operation of the synchronization reception device by controlling a communication circuit (e.g., the wireless communication module 192 of FIG. 1).

Referring to FIG. 10, according to an embodiment, in an operation 1010, the electronic device 101 may attempt to receive a synchronization signal at a specified timing (e.g., the number one subframe #1 of FIG. 4) in a plurality of time periods (e.g., the first time period 401, the second time period 402, and the third time period 403 of FIG. 4).

According to an embodiment, in an operation 1020, the electronic device 101 may select a synchronization signal having lowest signal strength among a plurality of synchronization signals corresponding to the plurality of time periods.

According to an embodiment, in an operation 1030, the electronic device 101 may select a SyncRef UE based on signal strength of the synchronization signals except for the selected synchronization signal. For example, the electronic device 101 may select a SyncRef UE based on an average value of the signal strength of the synchronization signals except for the selected synchronization signal.

Although FIG. 10 illustrates an embodiment in which a synchronization signal having lowest signal strength is excluded, the electronic device 101 may exclude a plurality of synchronization signals having lowest signal strength according to another embodiment. Furthermore, in another embodiment, the electronic device 101 may exclude a synchronization signal having signal strength less than a threshold.

As described above, an electronic device (e.g., the synchronization transmission device 310 or 320 of FIG. 3) according to an embodiment may include a communication circuit (e.g., the wireless communication module 192 of FIG. 1), a memory (e.g., the memory 130 of FIG. 1), and a processor (e.g., the processor 120 of FIG. 1) operatively connected to the communication circuit and the memory, wherein the processor may be configured to detect an event for transmitting a synchronization signal in a device-to-device (D2D) mode, start a first timer stored in the memory, transmit a synchronization signal at a specified first timing (e.g., the number one subframe #1 of FIG. 4) in a first time period (e.g., the first time period 401 of FIG. 4) in which the first timer operates and attempt to receive a synchronization signal at a specified second timing (e.g., the number two subframe #2 of FIG. 4) in the first time period, detect that a synchronization signal and a valid data packet have not been received until the first timer expires, and attempt to receive a synchronization signal at a timing (e.g., the number one subframe #1 of FIG. 4) corresponding to the specified first timing in a second time period (e.g., the third time period 403 of FIG. 4) after the first timer expires.

According to an embodiment, the valid data packet may include at least one of proximity service user equipment identifier (ProSe UE ID), ProSe group ID, or discovery message supported by the D2D mode.

According to an embodiment, the processor may be configured to determine that the electronic device is in an out of coverage (OOC) state in the D2D mode, and determine that the event for transmitting a synchronization signal has occurred when synchronization signal reception fails in the OOC state.

According to an embodiment, the processor may be configured to determine that the electronic device is in an OOC state in the D2D mode, and determine that the event for transmitting a synchronization signal has occurred when it is determined that the electronic device operates in a synchronization transmission mode.

According to an embodiment, the processor may be configured to start the first timer when it is determined that a group call is deactivated.

According to an embodiment, the processor may be configured to stop the first timer when the valid data packet is received before the first timer expires, increment the counter stored in the memory, start a second timer corresponding to the incremented counter, and restart the first timer when the second timer expires.

According to an embodiment, the processor may be configured to operate in a synchronization reception mode when the synchronization signal is received at the timing corresponding to the specified first timing in the second time period, and, when the synchronization signal is not received at the timing corresponding to the specified first timing in the second time period, increment the counter stored in the memory, start a third timer corresponding to the incremented counter, and restart the first timer when the third timer expires.

According to an embodiment, the second time period may correspond to a time period after N-th time period from the first time period, where N is a natural number.

According to an embodiment, the first time period and the second time period may include a plurality of subframes, and the specified first timing may include one subframe included in the plurality of subframes.

As described above, an electronic device according to an embodiment may include a communication circuit, a memory, and a processor operatively connected to the communication circuit and the memory, wherein the processor may be configured to attempt to receive a synchronization signal at a specified timing in a plurality of time periods in a D2D mode, select at least one synchronization signal having lowest signal strength among a plurality of synchronization signals corresponding to the plurality of time periods, and select a SyncRef UE based on signal strength of the plurality of synchronization signals except for the selected at least one synchronization signal.

According to an embodiment, the plurality of time periods each may include a plurality of subframes, and the specified timing may include one subframe among the plurality of subframes.

As described above, a method of an electronic device according to an embodiment may include detecting an event for transmitting a synchronization signal in a D2D mode, starting a first timer, transmitting a synchronization signal at a specified first timing in a first time period in which the first timer operates and attempting to receive a synchronization signal at a specified second timing in the first time period, detecting that a synchronization signal and a valid data packet have not been received until the first timer expires, and attempting to receive a synchronization signal at a timing corresponding to the specified first timing in a second time period after the first timer expires.

According to an embodiment, the valid data packet may include at least one of proximity service user equipment identifier (ProSe UE ID), ProSe group ID, or discovery message supported by the D2D mode.

According to an embodiment, the detecting of the event for transmitting a synchronization signal may include determining that the electronic device is in an out of coverage (OOC) state in the D2D mode, and detecting failure of reception of a synchronization signal in the OOC state.

According to an embodiment, the detecting of the event for transmitting a synchronization signal may include determining that the electronic device is in an OOC state in the D2D mode, and detecting that the electronic device operates in a synchronization transmission mode.

According to an embodiment, the starting of the first timer may include starting the first time when it is determined that a group call is deactivated.

According to an embodiment, the method may further include stopping the first timer when the valid data packet is received before the first timer expires, incrementing a counter, starting a second timer corresponding to the incremented counter, and restarting the first timer when the second timer expires.

According to an embodiment, the method may further include operating in a synchronization reception mode when the synchronization signal is received at the timing corresponding to the specified first timing in the second time period, and, when the synchronization signal is not received at the timing corresponding to the specified first timing in the second time period, incrementing a counter, starting a third timer corresponding to the incremented counter, and restarting the first timer when the third timer expires.

According to an embodiment, the second time period may correspond to a time period after N-th time period from the first time period, where N is a natural number.

According to an embodiment, the first time period and the second time period may include a plurality of subframes, and the specified first timing may include one subframe included in the plurality of subframes.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
communication circuitry;
memory; and
at least one processor operatively connected to the communication circuitry and the memory,
wherein the memory stores instructions that, when executed by the at least one processor, cause the electronic device to:
start a first timer based on an event for transmitting at least one synchronization signal in an out of coverage (OOC) state of a device-to-device (D2D) mode,
transmit, while the first timer is running, a first synchronization signal during a specific numbered subframe of a first time period,
based on failing to receive a second synchronization signal before the first timer expires, receive a third synchronization signal during at least a part of the specific numbered subframe of a second time period after the first timer expires, and
wherein each of the first time period and the second time period comprises a plurality of subframes.

2. The electronic device of claim 1, wherein the instructions, when executed by the at least one processor, further cause the electronic device to:
further based failing to receive both of the second synchronization signal and a valid data packet while the first timer is running, receive the third synchronization signal during at least a part of the specific numbered subframe of the second period,
wherein the valid data packet includes at least one of:
proximity service user equipment identifier (ProSe UE ID),
ProSe group ID, or
discovery message supported by the D2D mode.

3. The electronic device of claim 1, wherein the instructions, when executed by the at least one processor, further cause the electronic device to:
determine that the electronic device is in the OOC state in the D2D mode; and
determine that the event for transmitting the at least one synchronization signal has occurred when synchronization signal reception fails in the OOC state.

4. The electronic device of claim 1, wherein the instructions, when executed by the at least one processor, further cause the electronic device to:
   determine that the electronic device is in the OOC state in the D2D mode; and
   determine that the event for transmitting the at least one synchronization signal has occurred when it is determined that the electronic device operates in a synchronization transmission mode.

5. The electronic device of claim 3, wherein the instructions, when executed by the at least one processor, further cause the electronic device to start the first timer when it is determined that a group call is deactivated.

6. The electronic device of claim 2, wherein the instructions, when executed by the at least one processor, further cause the electronic device to:
   stop the first timer when the valid data packet is received before the first timer expires;
   increment a counter stored in the memory;
   start a second timer corresponding to the incremented counter; and
   restart the first timer when the second timer expires.

7. The electronic device of claim 1,
   wherein the instructions, when executed by the at least one processor, further cause the electronic device to:
   based on receiving the third synchronization signal, operate in a synchronization reception mode.

8. The electronic device of claim 1, wherein the second time period corresponds to a time period after N-th time period from the first time period, where N is a natural number.

9. The electronic device of claim 1,
   wherein the specific numbered subframe corresponds to a synchronization signal transmission period.

10. A method of an electronic device, comprising:
    starting a first timer based on an event for transmitting at least one synchronization signal in an out of coverage (OOC) state of a device-to-device (D2D) mode;
    transmitting, while the first timer is running, a first synchronization signal during a specific numbered subframe of a first time period;
    attempting, while the first timer is running, to receive a second synchronization signal during at least one subframe, other than the specific numbered subframe, of the first time period;
    based on failing to receive the second synchronization signal before the first timer expires, attempting to receive a third synchronization signal during at least a part of the specific numbered subframe of a second time period after the first timer expires,
    wherein each of the first time period and the second time period comprises a plurality of subframes.

11. The method of claim 10,
    wherein the attempting to receive the third synchronization signal comprises, based on failing to receive both of the second synchronization signal and a valid data packet while the first timer is running, attempting to receive the third synchronization signal during at least a part of the specific numbered subframe of the second period, and
    wherein the valid data packet includes at least one of:
    proximity service user equipment identifier (ProSe UE ID),
    ProSe group ID, or
    discovery message supported by the D2D mode.

12. The method of claim 10, further comprising:
    determining that the electronic device is in the OOC state in the D2D mode; and
    detecting the event based on a failure of reception of a synchronization signal in the OOC state.

13. The method of claim 10, further comprising:
    determining that the electronic device is in the OOC state in the D2D mode; and
    detecting the event based on the electronic device being operated in a synchronization transmission mode.

14. The method of claim 10, wherein the starting of the first timer includes starting the first time when it is determined that a group call is deactivated.

15. The method of claim 11, further comprising:
    based on receiving the valid data packet while the first timer is running, stopping the first timer, incrementing a counter, starting a second timer corresponding to the incremented counter, and restarting the first timer when the second timer expires.

16. An electronic device comprising:
    communication circuitry;
    memory; and
    at least one processor operatively connected to the communication circuitry and the memory,
    wherein the memory stores instructions that, when executed by the at least one processor, cause the electronic device to:
    determine that the electronic device is in an out of overage (OOC) state in a device-to-device (D2D) mode without an active group call,
    in response to the determination, at a first timing of a first time period for D2D synchronization, transmit a first synchronization signal and attempt to receive a second synchronization signal from at least one external device during the first time period other than the first timing,
    when failing to receive the second synchronization signal during the first time period;
    increase a value of a counter,
    start a timer with a length corresponding to the value of the counter,
    in response to an expiration of the timer, attempt to, at least for the first timing of a second time period for the D2D synchronization, receive a third synchronization signal from the at least one external device without transmitting a fourth synchronization signal.

17. The electronic device of claim 16, wherein the length of the timer is increased as the value of the counter is increased.

18. The electronic device of claim 16, wherein the instructions, when executed by the at least one processor, further cause the electronic device to refrain from attempting the D2D synchronization while the timer is running.

19. The electronic device of claim 16, wherein each of the first time period and the second time period corresponds to a sidelink control period.

20. The electronic device of claim 16, wherein the communication circuitry is configured to operate as a half-duplex mode in the D2D mode.

* * * * *